March 18, 1952  L. W. SHAHAN  2,589,970
WHISTLING ARTIFICIAL FISH LURE
Filed April 29, 1946  2 SHEETS—SHEET 1
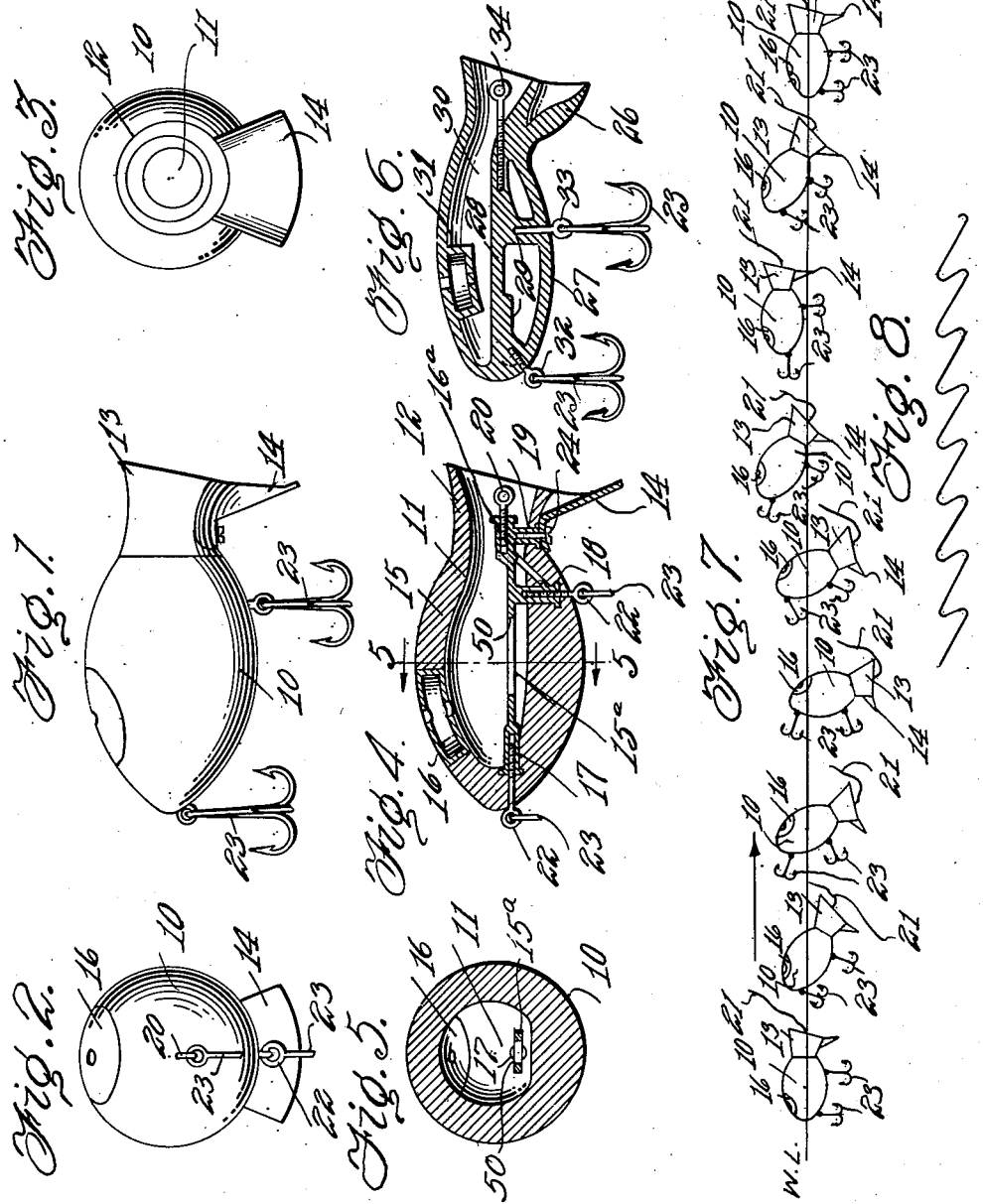
INVENTOR.
Louie W. Shahan.
BY Victor J. Evans & Co.
ATTORNEYS

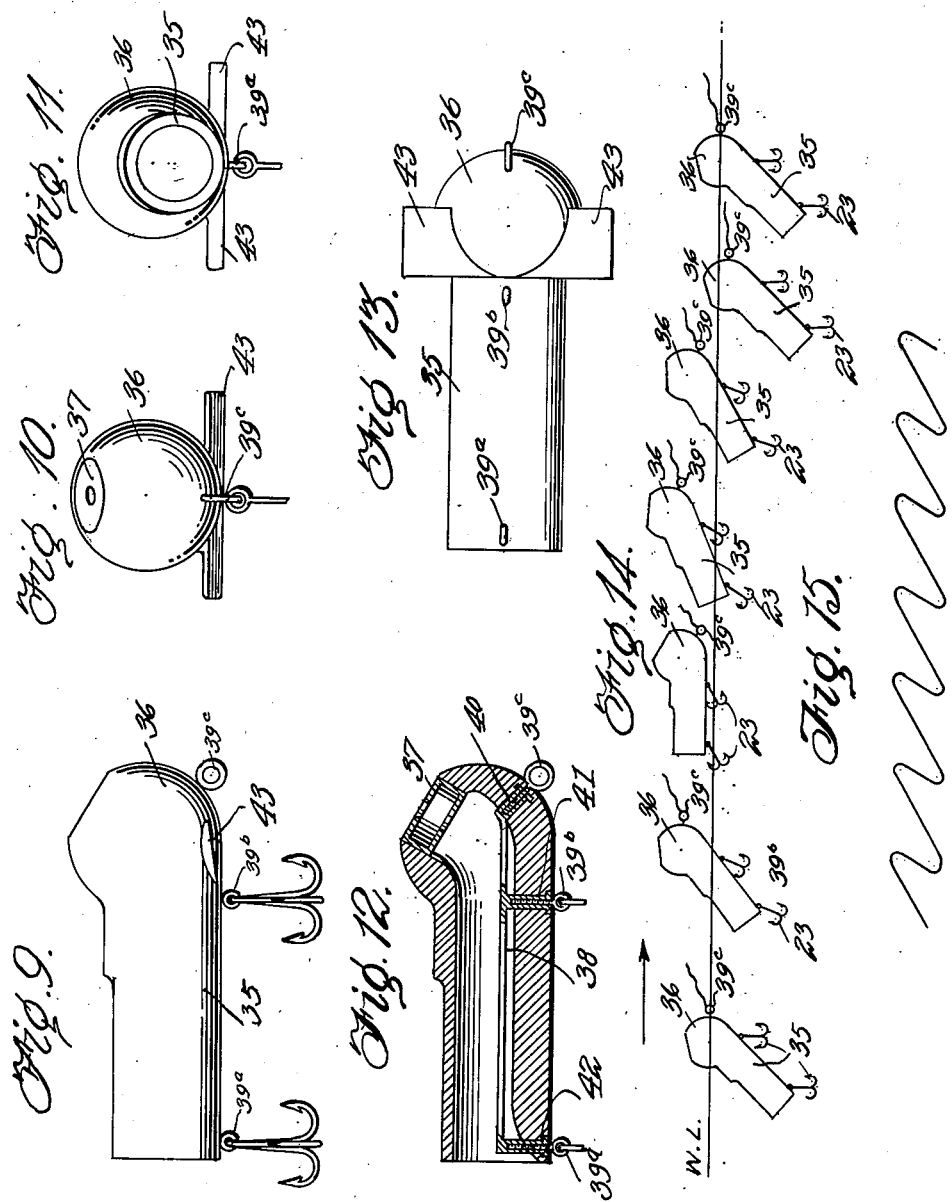

Patented Mar. 18, 1952

2,589,970

UNITED STATES PATENT OFFICE 2,589,970

WHISTLING ARTIFICIAL FISH LURE

Louie W. Shahan, Talladega, Ala.

Application April 29, 1946, Serial No. 665,824

1 Claim. (Cl. 43—42.06)

My present invention relates to an improved artificial fish lure and more particularly to the whistling type of artificial lure for fishermen and anglers.

The principal object of my invention is to provide a fish lure of the whistling type in which the fluid or water passing thereinto and therefrom causes air activity which in its exhaust, and intake, creates mainly a whistling sound, but also a gurgling and thumping sound, when the lure is bobbing in the water with its nose or head above or below the water line as the case may be. The whistling and other sounds produced will be intermittent under the lifting and bobbing action of the fishing lure and is positive in response to the action of the lure.

A further object of the invention is the provision of a lure of this character, wherein air is forced out of the lure by the movement of water entering and exhausting the air chamber, and also wherein air is forced into the air chamber by the movement of water receding from said chamber and in which the air in being exhausted and inhaled produces sound waves, preferably a whistling sound, and these sound wave vibrations attract the attention of the fish to the lure whereupon the hooks provided on the exterior of the lure catch the fish.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a side view of the artificial fish lure according to my invention.

Figure 2 is a rear elevational view thereof.

Figure 3 is a front elevational view.

Figure 4 is a vertical longitudinal sectional view.

Figure 5 is a transverse sectional view taken along line 5—5 of Figure 4.

Figure 6 is a longitudinal vertical sectional view of a lure embodying a modification.

Figure 7 is a diagrammatic view of the lure showing its various positions in forward movement.

Figure 8 is a schematic view or chart showing the cycle of movement of the lure in series.

Figure 9 is a side elevational view of a modified lure.

Figure 10 is a front elevational view thereof.

Figure 11 is a rear elevational view.

Figure 12 is a vertical longitudinal sectional view.

Figure 13 is a bottom plan view of the modified lure.

Figure 14 is a diagrammatic view of the modified lure showing its various positions in forward movement.

Figure 15 is a schematic view or chart showing the cycle of movement of the modified lure.

Referring now to the drawings in detail, with particular reference to Figures 1 through 5, the lure there shown as constructed according to my invention, comprises a bulbular body 10 preferably made of plastic or other suitable material, having a cavital air chamber or tunnel 11 extending longitudinally thereof which tunnel or cavity opens to the front extremity 12 of the body, the latter being formed with an outwardly tapered nose 13 and a lower scoop or diving lip 14, and the body is buoyant.

Within the crowning area 15 of the body 10 is provided a pair of spaced walls, each wall having an aperture therein providing a whistling element 16 which is in communication with the cavital chamber or tunnel 11 so that air compressed within the latter and under the pressure of water admitted through the opening in the extremity 12 will cause the whistle to sound, when the nose end 13 is submerged below the water line and with the tail end elevated in the water as illustrated in Figure 7 of the drawings.

Within the chamber or tunnel 11 and longitudinally of the body 10 slightly beneath the axis thereof in this direction is an anchoring frame 15a having the forward and aft internally threaded socket terminals 16a and 17 respectively, and intermediate, downwardly directed, similar terminals 18 and 19 respectively. The forward terminal 16a and the two downward terminals 18 and 19 are imbedded in the body 10, while detachably connected in the forward terminal 16a is a fishing line eye 20 to which is attached a line, a portion thereof being indicated at 21 in Figure 7 for use of the lure in fishing.

The frame or support 15a is formed with a flat intermediate section having an opening 50 therein and the sockets 16a and 17 are formed on the ends thereof, the terminal 18 extending from one side and being spaced down from the terminal 17.

The rearward terminal 17 and the downward terminal 18 have detachably connected thereto eyes 22 to which are loosely suspended fishing hooks 23. The remaining terminal 19 forward of the lure has detachably connected thereto by a fastener 24 a diving lip or scoop 14.

The diving lip or scoop 14 causes the nose of the lure to bob up and down and upon coming down upon the water surface a thumping sound is produced. Water sucking into the tunnel produces a gurgling sound.

In Figure 6 of the drawings there is shown a slight modification of the invention wherein the diving lip 26 is integral with the body 27 which in the hollow thereof is provided a web 28 and connecting struts 29. Above this web is the tunnel 30 opening forward of the body, and at the crown of the body is an integral whistle element 31 sounded by air movement therethrough. The chambers below the web 28 are air tight.

In Figures 9 through 14 of the drawings I have disclosed another modification of the invention, wherein the body 35 is of substantially cylindrical form having at the fore end a rearwardly angled, bulb-like nose or head 36, in which at the crown thereof is provided with a pair of spaced walls, each having an aperture therein and providing a whistling element 37. Longitudinally of the body 35 is an anchoring frame or support 38, with the eyes 39a, 39b, and 39c attached respectively at 40, 41 and 42, the eye 39c being the fishing line connection.

The nose or head 36 may have merged therewith the laterally directed wings or planes 43 adapted for gliding purposes. These wings are optional and may be used as desired according to the wishes of the fisherman.

On forward movement of the lure, a jerk imparted thereto causes the whistle to sound, and the lure in its travel will follow an up and down bobbing course as seen in Figures 7 and 8, and 14 and 15.

The lure, in Figure 5, rests on the surface of the water with the air chamber above the surface and free or empty of water. The line is jerked and the lip or scoop bobs the head down causing water to enter the mouth of the chamber thus forcing air out of the rear through the whistle. When pressure on the line is released the lure rises to the surface tail first and the receding water sucks air back into the chamber, through the whistle causing another whistle sound.

As shown in Figure 14 with the lure at rest, the head of the lure is out of the water. The air chamber is under the surface and full of water. The line is then jerked forwardly and the lure is lifted upward and forward while the water recedes from the air chamber sucking air therein through the whistle. When the line pressure is released the lure settles back into the water tail first which forces air in the chamber to exhaust through the whistle again sounding the whistle.

Having thus fully described my invention what I claim as new and desire to secure by Letters Patent is:

A fishing lure comprising a body having longitudinal cavital chamber portions therein and said chamber opening at one end thereof, the portion of said chamber adjacent the end of the body opposite to the end in which the chamber opens having spaced walls, each of said walls having apertures therein, the apertures being of such size that air entrapped between the walls when forced therefrom by air pressure of the chamber will produce a whistling sound, means extending longitudinally relative to the chamber constituting a support, and one or more fishing hooks attached to said support, said support having a fishing line attaching eye carried by one end thereof.

LOUIE W. SHAHAN.

REFERENCES CITED

The following references are of record in the file of this patent:

UNITED STATES PATENTS

| Number | Name | Date |
|---|---|---|
| 495,863 | Whitzel | Apr. 18, 1893 |
| 847,240 | Chamberlain | Mar. 12, 1907 |
| 923,670 | Lockhart | June 1, 1909 |
| 980,667 | Owen | Jan. 3, 1911 |
| 1,099,606 | Larrabee | June 9, 1914 |
| 1,176,962 | Heyer | Mar. 28, 1916 |
| 1,854,696 | Herington | Apr. 19, 1932 |
| 1,890,266 | Schadell et al. | Dec. 6, 1932 |
| 2,112,901 | Anderson | Apr. 5, 1938 |
| 2,155,294 | Barnett | Apr. 18, 1939 |
| 2,202,519 | Ferris | May 28, 1940 |
| 2,387,255 | Godlewski | Oct. 23, 1945 |